(12) United States Patent
Hwang et al.

(10) Patent No.: US 11,648,985 B2
(45) Date of Patent: May 16, 2023

(54) PREFABRICATED VEHICLE

(71) Applicants: Hyundai Motor Company, Seoul (KR); Kia Motors Corporation, Seoul (KR)

(72) Inventors: Jin Ho Hwang, Cheonan-si (KR); Dong Eun Cha, Hwaseong-si (KR); Sang Heon Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 307 days.

(21) Appl. No.: 17/011,094

(22) Filed: Sep. 3, 2020

(65) Prior Publication Data

US 2021/0331749 A1     Oct. 28, 2021

(30) Foreign Application Priority Data

Apr. 22, 2020   (KR) .................. 10-2020-0048749

(51) Int. Cl.
 *B62D 24/00* (2006.01)
 *B23Q 3/15* (2006.01)
 (Continued)

(52) U.S. Cl.
 CPC ........... *B62D 24/00* (2013.01); *B23Q 3/1543* (2013.01); *B62D 25/025* (2013.01); *B62D 27/06* (2013.01);
 (Continued)

(58) Field of Classification Search
 CPC ........ B62D 27/02; B62D 27/06; B62D 62/04; B62D 24/00; B62D 63/025; B62D 65/024; B62D 39/00; B23Q 3/1543
 (Continued)

(56) References Cited

U.S. PATENT DOCUMENTS 6,276,477 B1      8/2001   Ida
10,479,260 B2 *  11/2019  Pham .................... B60P 3/34
(Continued)

FOREIGN PATENT DOCUMENTS

CN    105905165 A  *  8/2016
CN    208602590 U      3/2019
(Continued)

OTHER PUBLICATIONS

Extended European Search Report dated Feb. 25, 2021 for European Patent Application No. 20194862.7.

*Primary Examiner* — Dennis H Redder
(74) *Attorney, Agent, or Firm* — Morgan, Lewis & Bockius LLP (57) ABSTRACT

A prefabricated vehicle may include a body module providing a vehicle body; a platform module having a battery and a driving wheel, and selectively fastened to the body module; a connecting portion that includes a magnetic module provided in any one of the body module and the platform module and an armature provided in a remaining one of the body module and the platform module, the connecting portion being configured such that the magnetic module and the armature face each other when the body module and the platform module are fastened to each other; and a controller connecting the body module and the platform module to each other to be easily replaceable by applying power to the magnetic module to allow the magnetic module and the armature to be connected to each other by a magnetic force.

12 Claims, 8 Drawing Sheets

(51) Int. Cl.
*B62D 25/02* (2006.01)
*B62D 27/06* (2006.01)
*B62D 65/04* (2006.01)
*G01D 5/14* (2006.01)
*B62D 65/02* (2006.01)
*B23Q 3/154* (2006.01)

(52) U.S. Cl.
CPC .......... *B62D 65/024* (2013.01); *B62D 65/04* (2013.01); *G01D 5/145* (2013.01)

(58) Field of Classification Search
USPC ............................ 296/39.1, 39.3, 35.1, 35.3
See application file for complete search history.

(56) References Cited

U.S. PATENT DOCUMENTS

| | | | |
|---|---|---|---|
| 10,479,427 | B2 | 11/2019 | Scaringe et al. |
| 10,493,832 | B1 | 12/2019 | White |
| 2006/0055201 | A1 | 3/2006 | Neuer et al. |
| 2017/0028900 | A1 | 2/2017 | Stocks et al. |
| 2018/0126871 | A1 | 5/2018 | Martinotti et al. |
| 2019/0232504 | A1 | 8/2019 | Radetzki et al. |

FOREIGN PATENT DOCUMENTS

| | | | | |
|---|---|---|---|---|
| CN | 110001823 A | | 7/2019 | |
| DE | 10 2017 216 779 A1 | | 3/2019 | |
| DE | 102017216779 A1 | * | 3/2019 | ............... B60K 1/04 |
| DE | 102018203120 A1 | | 9/2019 | |
| IT | 201800003333 | | 3/2018 | |
| JP | H05024563 A | | 2/1993 | |
| JP | 2020-045071 A | | 3/2020 | |
| KR | 101130218 B1 | | 3/2012 | |
| KR | 10-1235475 B1 | | 2/2013 | |
| KR | 10-1404028 B1 | | 6/2014 | |
| KR | 101427066 B1 | | 8/2014 | |
| KR | 1020180071675 A | | 6/2018 | |
| KR | 1020180089368 A | | 8/2018 | |
| KR | 10-2019-0031123 A | | 3/2019 | |
| KR | 10-2019-0031133 A | | 3/2019 | |
| SE | 1850807 A1 | | 1/2020 | |
| WO | WO 2018/230720 A1 | | 12/2018 | |

* cited by examiner

PREFABRICATED VEHICLE

CROSS REFERENCE TO RELATED APPLICATION

The present application claims priority to Korean Patent Application No. 10-2020-0048749, filed Apr. 22, 2020, the entire contents of which is incorporated herein for all purposes by this reference.

BACKGROUND OF THE PRESENT INVENTION

Field of the Invention

The present invention relates generally to a prefabricated vehicle, wherein a body module and a platform module are connectable to and separable from each other so that a vehicle is properly formed and used according to a purpose, and the body module and the platform module are securely coupled to each other by a magnetic force after being physically fastened to each other so that the vehicle may be safely used.

Description of Related Art

A concept of a traditional vehicle has been recognized as a means of transporting people or objects by driving a completed vehicle body. However, with the steady development of the external, internal materials, and components of a vehicle, a concept of a modern vehicle is recognized as a living space beyond simple transportation.

However, the purchase of a vehicle is still limited that, wherein a purchaser purchases a completed vehicle manufactured by the vehicle manufacturer and utilizes the completed vehicle. Since the purchaser has no choice but to purchase a completed vehicle manufactured according to a purpose, the vehicle may be purchased for each use. For example, a person who already owns a passenger vehicle for transportation may purchase a freight vehicle for freight transportation. The purchaser may purchase a vehicle within a range of completed vehicles provided by the vehicle manufacturer, since a vehicle configured for being actively configured into a vehicle body according to a purpose of use or preference has not been developed.

Since the completed vehicle manufacturer manufactures and sells only completed vehicles, inventory of completed vehicles is generated. Therefore, in the case of the conventional vehicle, the manufacturing costs are increased and processing cost of the inventory vehicle is incurred.

The present invention relates to a world's first fastening structure and fastening method of a purpose built vehicle (PBV), which may be modified and used according to a purpose by having a body module and a platform module that are configured to be connected to and separated from each other.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a prefabricated vehicle, which includes a physical fastening structure between a body module and a platform module and a connecting portion based on a magnetic force, so that separation, replacement, and coupling of each portion forming the vehicle may be free and stability may be secured when the portion is coupled to other parts.

According to various aspects of the present invention, there is provided a prefabricated vehicle. The prefabricated vehicle includes: a body module providing a vehicle body; a platform module having a battery and a driving wheel, and selectively fastened to the body module; a connecting portion which may have a magnetic module provided in any one of the body module and the platform module and an armature provided in a remaining one of the body module and the platform module, the connecting portion being configured such that the magnetic module and the armature may face each other when the body module and the platform module are fastened to each other; and a controller connecting the body module and the platform module to each other to be easily replaceable by applying power to the magnetic module to allow the magnetic module and the armature to be connected to each other by a magnetic force.

The body module may include a front module providing a front portion of the vehicle body, a cabin module providing an internal space of the vehicle, and a rear module providing a rear portion of the vehicle body, and the vehicle body may be formed by connecting the front module, the cabin module, and the rear module in series.

A rail may be provided at one side of any one of the body module and the platform module and a guide receiving the rail therein may be provided at one side of a remaining one thereof, and when the rail is inserted into the guide, the body module and the platform module may be fastened to each other.

The guide may have an open first side surface and a closed second side surface to allow the rail to be inserted into the first side surface of the guide, and a protruding guide pin may be provided at any one of an end portion of the rail and the second side surface of the guide and a guide hole receiving the guide pin may be provided at a remaining one thereof, and when the body module and the platform module are completely fastened to each other, the guide pin may be inserted into the guide hole.

The rail may include two rails and the guide may include a first guide and a second guide which may receive the rails respectively, and the first guide may have a first guide hole having a size corresponding to a size of the guide pin so that the guide pin may be inserted therein and fixed, and the second guide may have a second guide hole formed to be greater than the size of the guide pin so that the guide pin may be movable at a predetermined distance after being inserted therein.

The connecting portion may be provided at a side sill of the body module.

The side sill may be configured to be spaced from a floor of the platform module at a determined distance upwards so that the side sill may be prevented from interfering with the battery when the body module and the platform module are fastened to each other.

The body module may be fastened to the platform module in a front to rear direction thereof.

A rail may be provided at any one of a lower surface of the body module and an upper surface of the platform module, the rail being formed by extending in the front to rear direction thereof, and a guide may be provided at a remaining one thereof, the guide being formed by extending in the front to rear direction and being configured to receive the rail therein, wherein the guide may have an open first side surface and a closed second side surface, thus the rail may be inserted into the open first side surface of the guide to be fastened thereto.

The body module may include a front module providing a front portion of the vehicle body, a cabin module providing an internal space of the vehicle, and a rear module providing a rear portion of the vehicle body, wherein the front module and the rear module may be integrally formed into a single body with the platform module and the cabin module may be fastened between the front module and the rear module in a left to right direction thereof, providing the vehicle body.

A rail which may be formed by extending in the left to right direction may be provided at each of a front surface and a rear surface of the cabin module and a guide which may be formed by extending in the left to right direction and receive the rail may be provided at each of a rear surface of the front module and a front surface of the rear module, and the guide may have an open first side surface and a closed second side surface, thus the rail may be inserted into the open first side surface of the guide to be fastened thereto.

The body module may be fastened to the platform module in a top to down direction thereof.

A guide pin protruding vertically may be provided at any one of a lower surface of the body module and an upper surface of the platform module and a guide hole which may be depressed vertically to receive the guide pin may be provide at a remaining one thereof, and when the body module and the platform module are fastened together, the guide pin may be inserted into the guide hole.

The connecting portion may have a Hall sensor which may measure voltage generated by formation of a magnetic field, and it may be determined whether the body module and the platform module are completely coupled together or not by the Hall sensor measurement value.

As described above, in the prefabricated vehicle of the present invention, the body module and the platform module that form the vehicle are configured to be separated from and coupled to each other so that the configuration of the vehicle may be modified according to a purpose of use. Accordingly, the vehicle may be modified into vehicles having various purposes.

Furthermore, the body module and the platform module are not only physically coupled to each other, but also may be coupled to and separated from each other by magnetic path control of the magnetic module. Accordingly, the configuration of the vehicle may be simple and the vehicle control may be easy.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description, the structural or functional description specified to exemplary embodiments according to the concept of the present invention is intended to describe the exemplary embodiments of the present invention, so it may be understood that the present invention may be variously embodied, without being limited to the exemplary embodiments.

Embodiments described herein may be changed in various ways and various shapes, so specific embodiments are shown in the drawings and will be described in detail in the exemplary embodiment of the present invention. However, it may be understood that the exemplary embodiments according to the concept of the present invention are not limited to the exemplary embodiments which will be described hereinbelow with reference to the accompanying drawings, but all of modifications, equivalents, and substitutions are included in the scope and spirit of the present invention.

It will be understood that, although the terms first and/or second, etc. may be used herein to describe various elements, these elements may not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "coupled directly to" another element, it may be connected to or coupled to another element without the other element intervening therebetween. Furthermore, the terms used herein to describe a relationship between elements, that is, "between", "directly between", "adjacent" or "directly adjacent" may be interpreted in the same manner as those described above.

Hereinafter, various exemplary embodiments will be described hereafter in detail with reference to the accompanying drawings. Like reference numerals provided in the drawings indicate like components.

Figure 1:
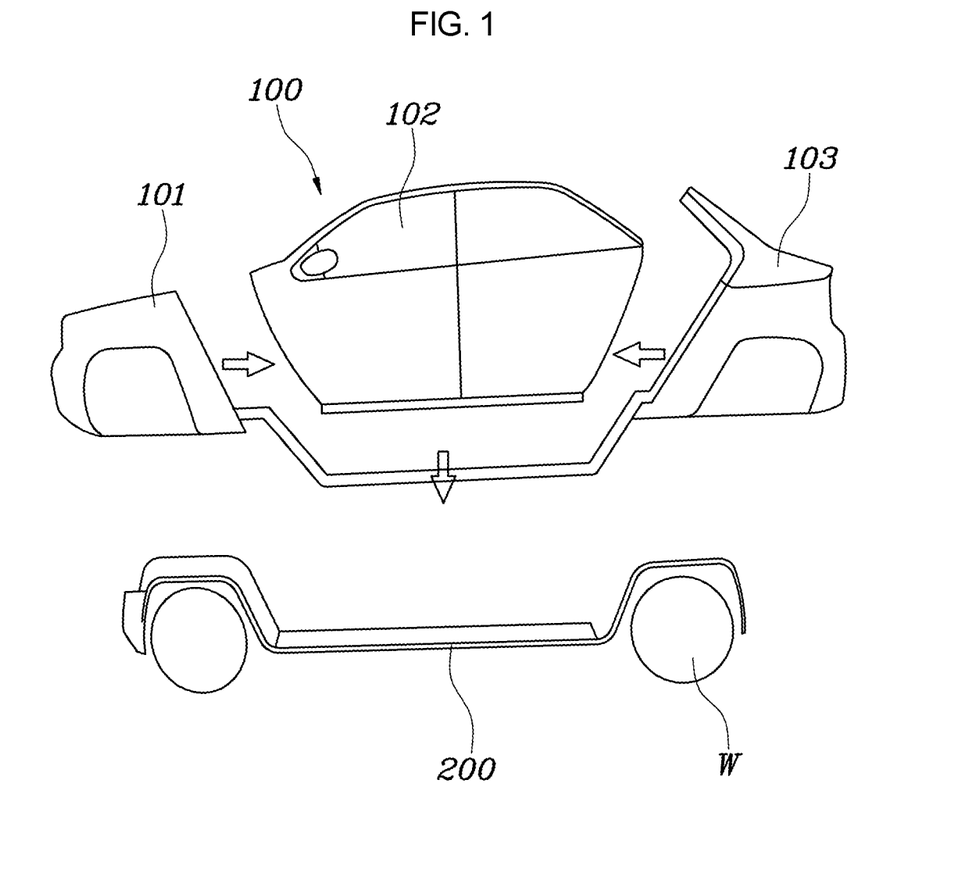
FIG. 1 is a view showing a figure of a prefabricated vehicle according to various exemplary embodiments of the present invention.

FIG. 1 is a view showing a figure of a prefabricated vehicle according to various exemplary embodiments of the present invention. As shown in FIG. 1, the present invention relates to a vehicle which is configured for a body module 100 providing a vehicle body and a platform module 200 providing a driving portion, and is assemblable as the body module 100 is removably connected to the platform module 200.

The body module 100 may include a front module 101 providing a front portion of the vehicle body, a cabin module 102 providing an internal space of the vehicle, and a rear module 103 providing a rear portion of the vehicle body. The cabin module 102 may be connected between the front module 101 and the rear module 103 to form the body module 100.

The platform module 200 may have a driving wheel W driving the vehicle and a battery 201 providing a driving energy. When the body module 100 and the platform module 200 are connected to each other, the battery 201 may supply electricity to the body module 100.

After the body module 100 and the platform module 200 are fastened to each other physically, when power is applied to a magnetic module 320, as a magnetic force is generated in a connecting portion 300, the body module 100 and the platform module 200 may be connected to each other. Accordingly, the body module 100 and the platform module 200 may be securely connected to each other in physical and magnetic manners, and may be easily separated from each other by applying power in the opposite direction thereof.

The connecting portion 300 may be provided at a side sill 120 provided at an outside surface of the vehicle. Since the side sill 120 is formed of a high-rigidity material, it is possible to prevent the connecting portion 300 from being damaged even in an external impact.

Also, the side sill 120 is provided to be spaced from a floor of the platform module 200 at a predetermined interval upwards. Therefore, an armature 310 and the magnetic module 320 may be positioned at the predetermined interval above a position of the floor. A portion of the floor may be bent upward so that the battery 201 is built in the platform module 200, and in the instant case, since the battery 201 may interfere with the body module 100 when the body module 100 is fastened to the platform module 200, the battery 201 may avoid interference with the body module 100 by having the predetermined interval.

Figure 2:
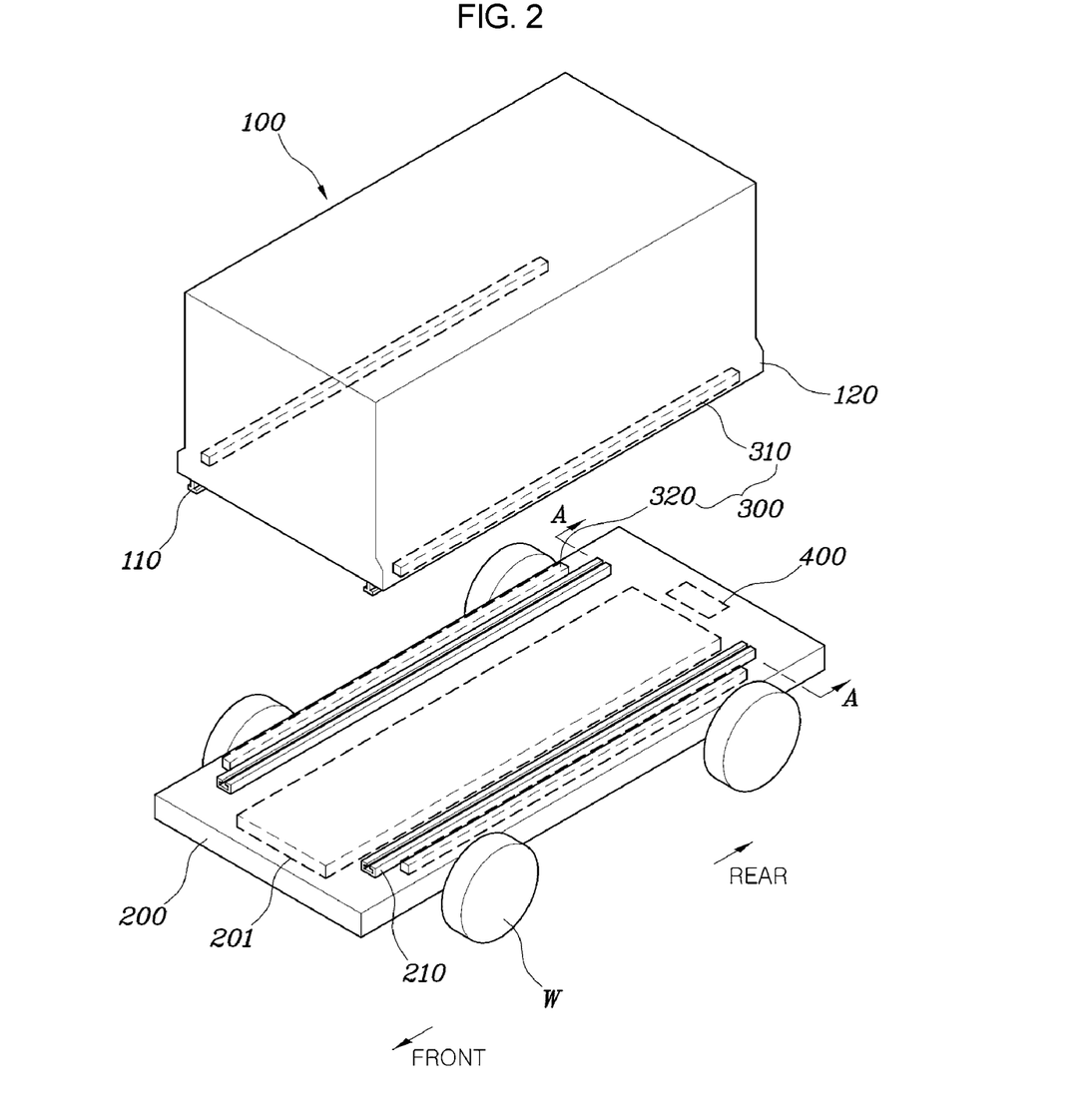
FIG. 2 is a view showing a body module and a platform module of the prefabricated vehicle according to various exemplary embodiments of the present invention.
Figure 3:
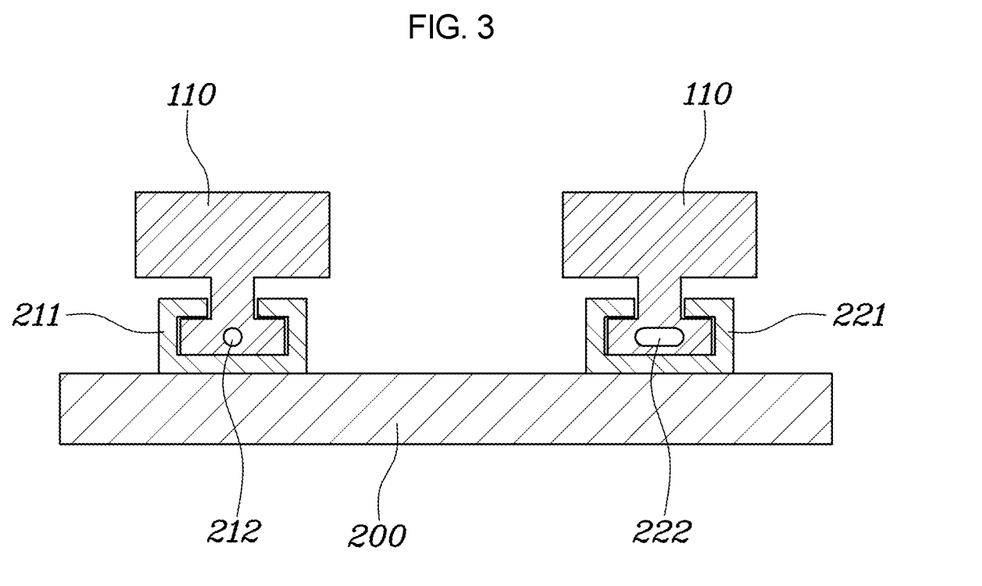
FIG. 3 is a cross-sectional view taken along line A-A of FIG. 2 after the body module 100 is coupled to the platform 200.

FIG. 2 is a view showing the body module 100 and the platform module 200 of the prefabricated vehicle according to various exemplary embodiments of the present invention, and FIG. 3 is a cross-sectional view taken along line A-A of FIG. 2 after the body module 100 is coupled to the platform 200.

Referring to FIG. 2, in the prefabricated vehicle according to the various exemplary embodiments of the present invention, the body module 100 is fastened to the platform module 200 by being inserted therein from the front or the rear of the platform module 200.

The connecting portion 300 may include the armature 310 and the magnetic module 320. The magnetic module 320 may include an electromagnet that generates a magnetic force when power is applied. The armature 310 is a magnetic material, and may be coupled to or separated from the magnetic module 320 by the magnetic force. The connecting portion 300 may be a magnetic body holding device, such as a permanent magnet workholding device. The magnetic body holding device is provided to attach an object to another object to be coupled by use of a magnetic force of a permanent magnet and to separate the object by controlling a magnetic flow in reverse, and is widely used in various machine tools.

As a closed circulation magnetic path generated in the magnetic module 320 passes through the armature 310, the magnetic module 320 and the armature 310 may be coupled to each other. When the armature 310 and the magnetic module 320 are coupled to each other by the magnetic force after power is applied for a predetermined time period, even when power supply is stopped, the magnetic path is maintained to maintain coupling force between the armature 310 and the magnetic module 320. Therefore, it may be advantageous to secure the stability of a structure of the present invention.

The armature 310 and the magnetic module 320 may be built in the body module 100 or the platform module 200, respectively. As shown in FIG. 2, the armature 310 may be built in the body module 100 and the magnetic module 320 may be built in the platform module 200, or on the contrary, the magnetic module 320 may be built in the body module 100 and the armature 310 may be built in the platform module 200.

When the body module 100 and the platform module 200 are fastened to each other to form the vehicle, the connecting portion 300 may be formed such that the armature 310 and the magnetic module 320 are configured to face each other. That is, a magnetic force is generated as power is applied to the magnetic module 320 and thus the armature 310, which is the magnetic material, is coupled to the magnetic module 320, so that both the armature 310 and the magnetic module 320 may be configured to face each other to form the connecting portion 300. Thus, the body module 100 and the platform module 200 may be efficiently coupled to each other to form the vehicle.

A controller 400 is a device configured for applying power to the magnetic module 320 or releasing power therefrom. The controller 400 may be electrically connected to the magnetic module 320. After the body module 100 and the platform module 200 are fastened to each other to form the vehicle, the controller 400 may apply power to the magnetic module 32 to allow the magnetic force to be generated in the magnetic module 320 and to flow in one direction thereof, so that the armature 310 may be coupled to the magnetic module 320. When the vehicle is disassembled, the controller 400 may control the magnetic force to flow in the opposite direction thereof, so that the armature 310 and the magnetic module 320 may be separated from each other.

As described above, since the armature 310 and the magnetic module 320 may be easily coupled to and separated from each other by the power application control and power direction control of the controller 400, replacement of the body module 100 and the platform module 200 may be easily performed.

As shown in FIG. 2, the controller 400 may be provided at the platform module 200, but is not limited thereto. That is, the controller 400 may be provided at the body module 100. The controller 400 is provided at a module having the magnetic module 320.

Also, a rail 110 may be provided at one side of any one of the body module 100 and the platform module 200, and a guide 210 may be provided at a remaining one thereof. In the various exemplary embodiments of the present invention, the rail 110 and the guide 210 are formed by extending in a front to rear direction thereof. As the rail 110 is inserted into the guide 210, the body module 100 and the platform module 200 may be fastened to each other.

Positions of the rail 110 and the guide 210 may be changed with each other. That is, when the rail 110 is provided at the body module 100, the guide 210 is provided at the platform module 200, and on the contrary, when the guide 210 is provided at the body module 100, the rail 110 is provided at the platform module 200, and the structure is equally applied to other embodiments. In the case of the exemplary embodiment shown in FIG. 2, the rail 110 is provided at the body module 100 and the guide 210 is provided at the platform module 200, but the present invention is not limited thereto.

The guide 210 may have an open first side surface and a closed side surface. The rail 110 may be fastened to the guide 210 by being inserted into the open first side surface of the guide 210 to reach the closed second side surface. Like the various exemplary embodiments of the present invention, when the body module 100 is inserted into the platform module in the front to rear direction thereof, the front surface or the rear surface of the guide 210 may be open or closed. Like various exemplary embodiments of the present invention, when the body module 100 is inserted into the platform module in a left to right direction thereof, a lateral surface of the guide 210 may be open or closed.

A protruding guide pin 111 may be provided at any one of an end portion of the rail 110 and the second side surface of the guide 210, and a guide hole receiving the guide pin 111 may be provided at a remaining one thereof. Accordingly, when the body module 100 and the platform module 200 are completely fastened to each other, the guide pin 111 may be inserted into the guide hole. Even when an external force is applied to the vehicle body, the body module 100 and the platform module 200 are securely fastened to each other by the guide pin 111 and the guide hole.

Referring to FIG. 2 and FIG. 3, the rail 110 may have two rails. The platform module 200 may have a first guide 211 and a second guide 221 that receive the rails 110 respectively. The first guide 211 may have a first guide hole 212 formed in a shape corresponding to a size of the guide pin 111 so that the guide pin 111 is inserted therein and fixed. Accordingly, when the guide pin 111 is inserted into the first guide 211, the guide pin 111 may not be removed from the first guide 211 and be fixed.

The second guide 221 may have a second guide hole 222 formed to be greater than the size of the guide pin 111 so that the guide pin 111 is moveable at a predetermined distance after being inserted therein. When the guide pin 111 is inserted into the second guide hole 222, the guide pin 111 is moveable in the predetermined distance, so after the fastening, the guide pin 111 may be properly moved to remove the tolerance. After the fastening, when the body module 100 and the platform module 200 are connected to each other by the connecting portion 300, the coupling may be fixed by removing the tolerance.

Figure 4:
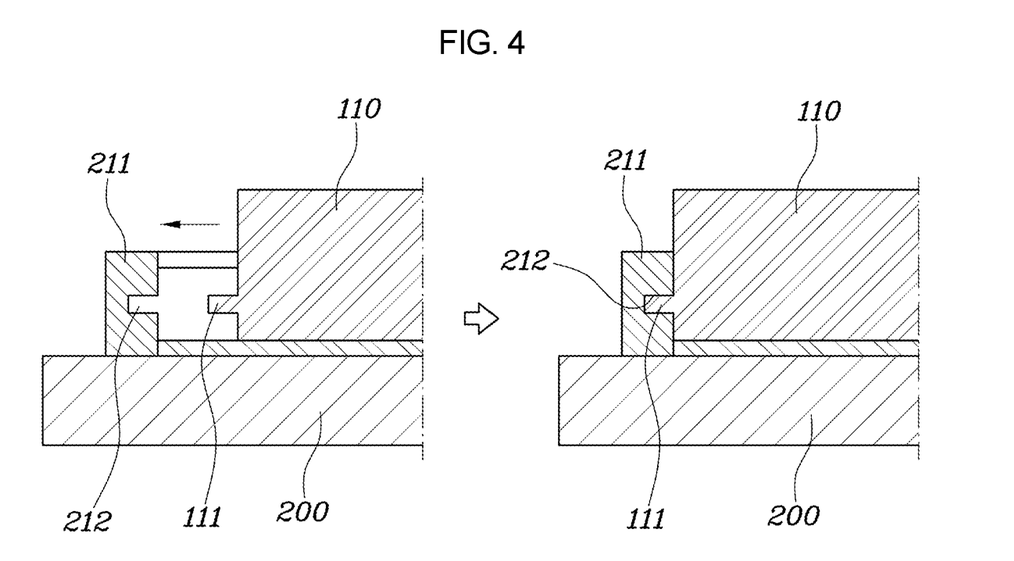
FIG. 4 is a view showing insertion of a rail of the prefabricated vehicle into a guide thereof according to the various exemplary embodiments of the present invention.

FIG. 4 is a view showing insertion of the rail 110 of the prefabricated vehicle into the guide 210 thereof according to the various exemplary embodiments of the present invention. In FIG. 4, the rail 110 is provided at the body module 100 and the guide 210 is provided at the platform module 200.

When the body module 100 and the platform module 200 are fastened to each other to form the vehicle, the rail 110 may be inserted into the guide 210 and then slide. When the rail 110 is completely inserted into the guide 210 while sliding, the guide pin 111 may be inserted into the guide hole and be fixed. When the tolerance in the design dimension exists, the tolerance may be eliminated by the second guide hole 222 described above. When the guide pin 111 is coupled to the guide hole and a position thereof is fixed, power is applied to the magnetic module 320 so that the position may be fixed by the magnetic force.

Figure 5:
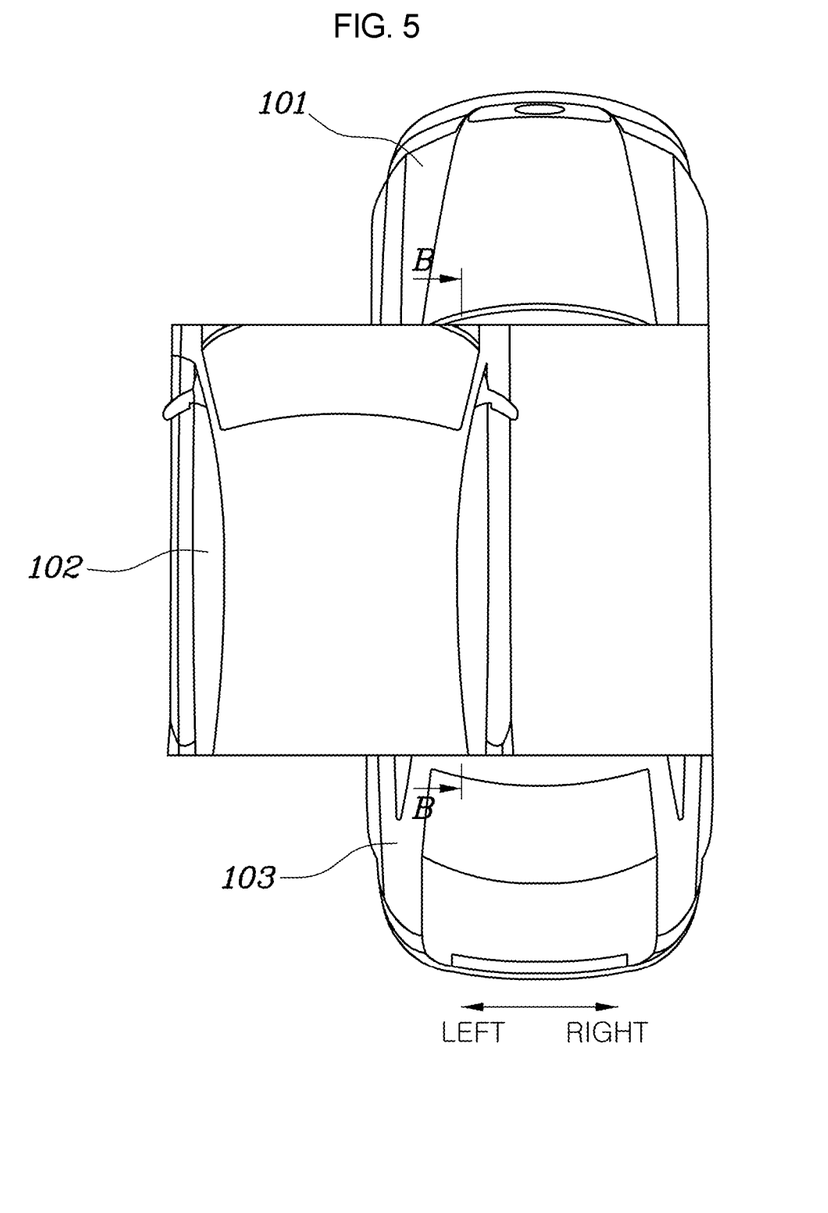
FIG. 5 is a view showing fastening of the prefabricated vehicle according to various exemplary embodiments of the present invention.
Figure 6:
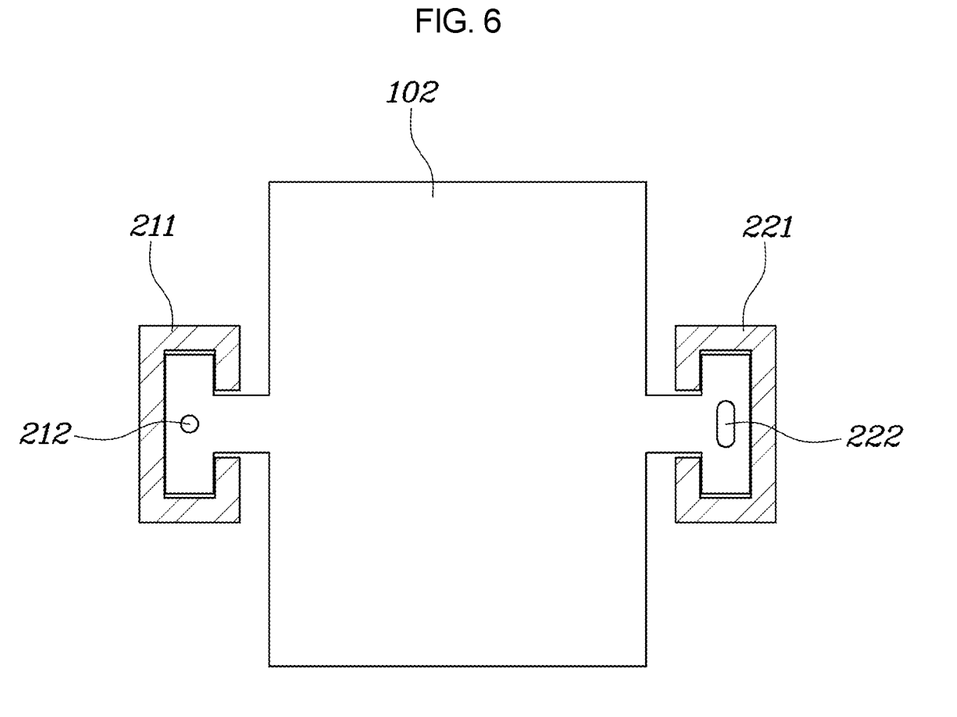
FIG. 6 is a cross-sectional view taken along line B-B of FIG. 5.

FIG. 5 is a view showing fastening of the prefabricated vehicle according to the various exemplary embodiments of the present invention, and FIG. 6 is a cross-sectional view taken along line B-B of FIG. 5.

Referring to FIG. 5 and FIG. 6, in the prefabricated vehicle according to the various exemplary embodiments of the present invention, the body module 100 may include the front module 101, the cabin module 102, and the rear module 103. The front module 101 and the rear module 103 are integrally formed into a single body with the platform module 200, and the cabin module 102 may be fastened between the front module 101 and the rear module 103 in the left to right direction to form the body module 100.

Referring to FIG. 6, the rail 110 which is formed by extending in the left to right direction is provided at each of a front surface and a rear surface of the cabin module 102. The guide 210 which is formed by extending in the left to right direction and receives the rail 110 is provided at each of a rear surface of the front module 101 and a front surface of the rear module 103. Accordingly, when the rail 110 of the cabin module 102 is inserted into the guide 210, the cabin module 102 may be fastened to the front module 101 and the rear module 103 to form the body module 100. The controller 400 applies power to the magnetic module 320 after formation of the body module 100 to connect the body module 100 to the platform module 200.

In the case of the prefabricated vehicle according to the various exemplary embodiments of the present invention, since the cabin module 102 is removable, only the cabin module 102 may be replaced when necessary. Since the cabin module 102 has the highest demand to be replaced, the cabin module 102 providing an internal space of a vehicle and being provided for passenger boarding, the vehicle may be used by replacing the cabin module 102 according to a purpose. Furthermore, the cabin module 102 may be securely coupled to the platform module 200 as the front and rear surface thereof are fastened to the front module 101 and rear module 103, respectively.

Figure 7:
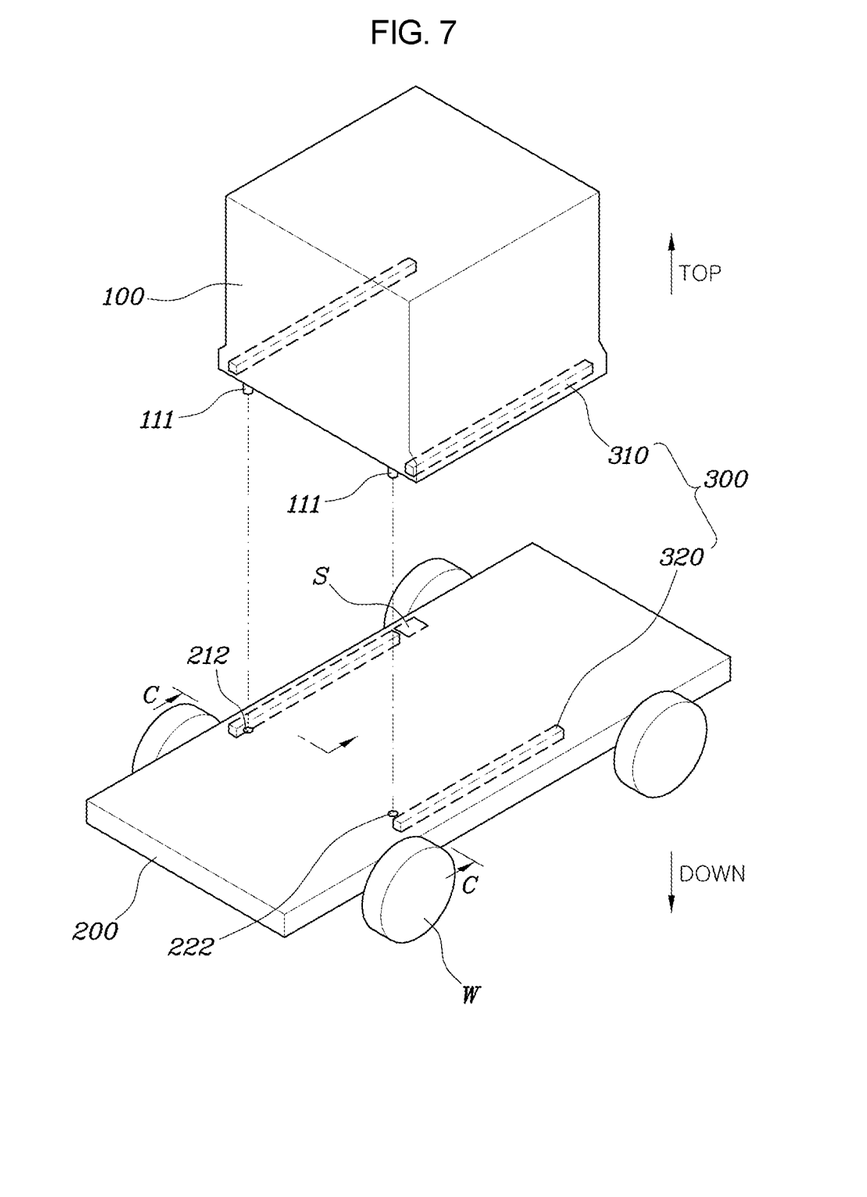
FIG. 7 is a view showing fastening of the prefabricated vehicle according to various exemplary embodiments of the present invention.
Figure 8:
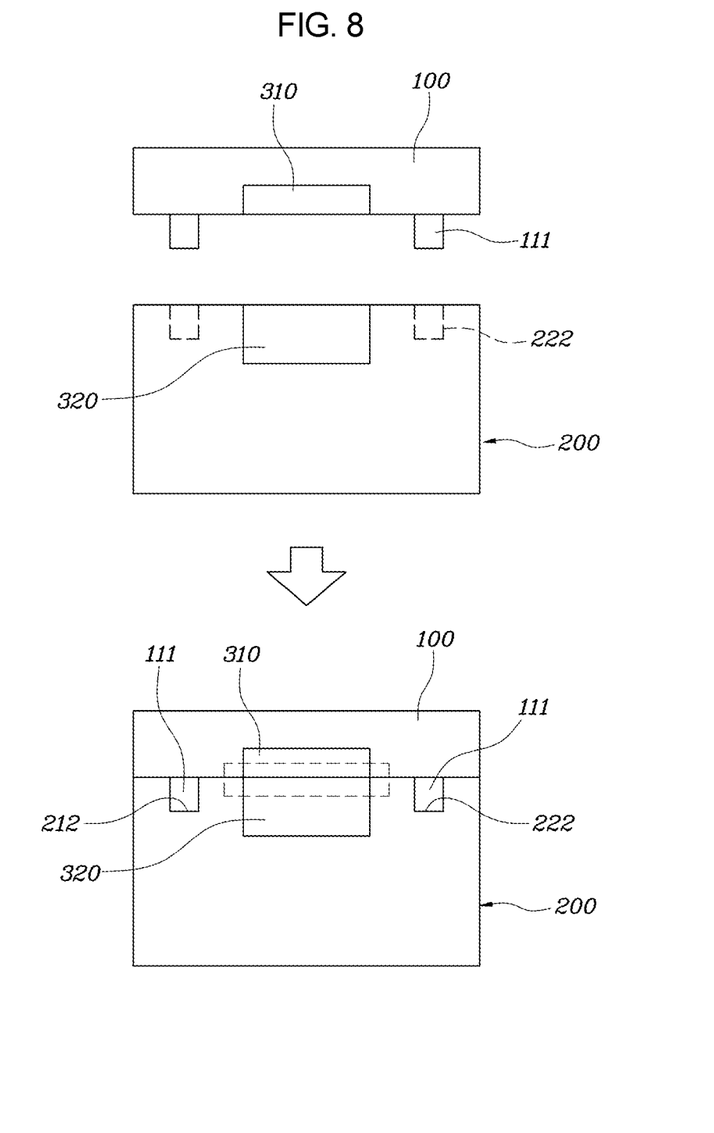
FIG. 8 is a cross-sectional view taken along line C-C of FIG. 7.

FIG. 7 is a view showing fastening of the prefabricated vehicle according to various exemplary embodiments of the present invention, and FIG. 8 is a cross-sectional view taken along line C-C of FIG. 7.

Referring to FIGS. 7 and 8, the body module 100 may be fastened to the platform module 200 in a top to down direction thereof. When the body module 100 and the platform module 200 are fastened to each other to form the vehicle, the body module 100 may be fastened to the platform module 200 from an upper side of the platform module 200.

In the prefabricated vehicle according to the various exemplary embodiments of the present invention, the guide pin 111 may be provided at any one of a lower surface of the body module 100 and an upper surface of the platform module 200, and the guide hole may be provided at a remaining one thereof. The guide pin 111 is formed by protruding in the top portion to down direction thereof, and the guide hole is formed by being depressed in the top portion to down direction so that the guide pin 111 may be inserted into the guide hole. Accordingly, the guide pin 111 is inserted into the guide hole thus the body module 100 and the platform module 200 may be fastened to each other. The guide pin 111 and the guide hole may have a plurality of pins and holes, and the present invention is not limited in number.

Referring to FIG. 8, a fastening process between the body module 100 and the platform module 200 will be referred to as follows. The body module 100 may be fastened to the platform module 200 from the upper side of the platform module 200 and may be fixed as the guide pin 111 is inserted into the guide hole. When the fastening is completed, the armature 310 and the magnetic module 320 face each other and are brought into contact with each other. When power is applied by the controller 400 after the fastening is completed, the magnetic path is generated in the magnetic module 320 and then flows toward the armature 310 to form the connecting portion 300. The body module 100 and the platform module 200 are securely coupled to each other by the connecting portion 300 to form the vehicle. When separation, the controller 400 applies power in the opposite direction to remove the magnetic path formed in the connecting portion 300, whereby the armature 310 and the magnetic module 320 are separated from each other.

The connecting portion 300 may include a Hall sensor S. The Hall sensor S reacts with a magnetic field to generate a voltage, and amplifies and detects the voltage. The voltage measured by the Hall sensor S may determine whether the body module 100 and the platform module 200 are completely fastened to each other. When the body module 100 and the platform module 200 are completely fastened to each other, a voltage value measured by the Hall sensor S may be set as a reference value.

The Hall sensor S may be provided at the armature 310 or at the magnetic module 320. The Hall sensor S may react the magnetic field generated in the connecting portion 300 to measure a voltage. When the fastening between the body module 100 and the platform module 200 is incomplete, the voltage value measured by the Hall sensor S deviates significantly from the reference value, and accordingly, the fastening may be checked. When the vehicle drives with a state of incomplete fastening, an accident may occur. Therefore, the vehicle may be used after determining in advance whether the fastening is complete or not by use of the Hall sensor S to prevent the accident. When the incomplete fastening is determined by the Hall sensor S, a warning signal may be sent out.

As described above, in the prefabricated vehicle according to various exemplary embodiments of the present invention, each portion forming the vehicle may be separated from and coupled to other parts, thus the vehicle may be used by replacing a portion according to a purpose. Without having to purchase a vehicle for each purpose, a user can use the vehicle by having the one platform module 200 and only replacing the body module 100, and the vehicle may be stably configured by the connecting portion 300.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A prefabricated vehicle comprising:
   a body module providing a vehicle body;
   a platform module having a battery and a driving wheel, and selectively fastened to the body module;
   a connecting portion that includes a magnetic module provided in one of the body module and the platform module and an armature provided in a remaining one of the body module and the platform module, the connecting portion being configured so that the magnetic module and the armature face each other when the body module and the platform module are fastened to each other; and a controller connecting the body module and the platform module to each other by applying electric power to the magnetic module to allow the magnetic module and the armature to be connected to each other by a magnetic force, wherein a rail is provided at the body module and a guide receiving the rail is provided at the platform module, and when the rail is inserted into the guide, the body module and the platform module are fastened to each other, wherein the guide has an open first side surface and a closed second side surface to allow the rail to be inserted into the open first side surface of the guide, and wherein a guide pin is provided to be protruded from a surface of an end portion of the rail and a guide hole receiving the guide pin is provided at the closed second side surface of the guide, and when the body module and the platform module are fastened to each other, the guide pin is inserted into the guide hole.

2. The prefabricated vehicle of claim 1, wherein the body module includes a front module providing a front portion of the vehicle body, a cabin module providing an internal space of the vehicle, and a rear module providing a rear portion of the vehicle body, and the vehicle body is formed by connecting the front module, the cabin module, and the rear module in series.

3. The prefabricated vehicle of claim 1, wherein the rail is formed in plural to include first and second rails and the guide is formed in plural to include a first guide and a second guide, the first guide receiving the first rail and the second guide receiving the second rail, wherein the guide pin is formed in plural to include first and second guide pins, and wherein the first guide has a first guide hole having a size corresponding to a size of the first guide pin so that the first guide pin is inserted and fixed in the first guide hole, and the second guide has a second guide hole formed to be greater than a size of the second guide pin so that the second guide pin is movable at a predetermined distance after being inserted in the second guide hole.

4. The prefabricated vehicle of claim 1, wherein the connecting portion is provided at a side sill of the body module.

5. The prefabricated vehicle of claim 4, wherein the side sill is spaced from a floor of the platform module at a determined distance upwards from the floor of the platform module so that the side sill is prevented from interfering with the battery when the body module and the platform module are fastened to each other.

6. The prefabricated vehicle of claim 1, wherein the body module is fastened to the platform module in a front to rear direction of the platform module.

7. The prefabricated vehicle of claim 6, wherein the rail is provided at a lower surface of the body module, the rail being formed by extending in the front to rear direction, and the guide is provided at the platform module, the guide being formed by extending in the front to rear direction and being configured to receive the rail therein, and wherein the guide has the open first side surface and the closed second side surface, thus the rail is inserted into the open first side surface of the guide to be fastened to the guide.

8. The prefabricated vehicle of claim 1, wherein the body module includes a front module providing a front portion of the vehicle body, a cabin module providing an internal space of the vehicle, and a rear module providing a rear portion of the vehicle body, and wherein the front module and the rear module are integrally formed into a single body with the platform module and the cabin module is fastened between the front module and the rear module in a width direction of the vehicle, providing the vehicle body.

9. The prefabricated vehicle of claim 8, wherein the rail which is formed by extending in a left to right direction of the cabin module is provided at each of a front surface and a rear surface of the cabin module and the guide which is formed by extending in the left to right direction and receives the rail is provided at each of a rear surface of the front module and a front surface of the rear module, and thus the rail is inserted into the open first side surface of the guide to be fastened to the guide.

10. The prefabricated vehicle of claim 1, wherein the body module is fastened to the platform module in a top to down direction of the platform module.

11. The prefabricated vehicle of claim 1, wherein the connecting portion includes a sensor and the controller is configured to determine whether the body module and the platform module are completely coupled together or not by use of the sensor.

12. The prefabricated vehicle of claim 11, wherein the sensor is a Hall sensor that measures voltage generated by formation of a magnetic field, and the controller is configured to determine whether the body module and the platform module are completely coupled together or not by use of the Hall sensor.

* * * * *